United States Patent
Suda

(10) Patent No.: US 7,030,330 B2
(45) Date of Patent: Apr. 18, 2006

(54) KEYBOARD SPILL-PROOFING MECHANISM

(75) Inventor: Kazutoshi Suda, Fujisawa (JP)

(73) Assignee: Minebea Co., Ltd., Miyota-Machi (JP)

( * ) Notice: Subject to any disclaimer, the term of this patent is extended or adjusted under 35 U.S.C. 154(b) by 0 days.

(21) Appl. No.: 10/391,002

(22) Filed: Mar. 18, 2003

(65) Prior Publication Data

US 2003/0179540 A1   Sep. 25, 2003

(30) Foreign Application Priority Data

Mar. 19, 2002  (JP) .............................. 2002-076158

(51) Int. Cl.
*H01H 9/00*   (2006.01)
(52) U.S. Cl. .................... 200/302.2; 200/314
(58) Field of Classification Search ................ 200/5 A, 200/314, 512–517, 329, 341, 302.2
See application file for complete search history.

(56) References Cited

U.S. PATENT DOCUMENTS

| 6,054,939 A * | 4/2000 | Wei et al. ...................... 341/20 |
| 6,156,983 A * | 12/2000 | Chen et al. .............. 200/302.1 |
| 6,444,928 B1 * | 9/2002 | Okamoto et al. ........... 200/5 A |
| 6,688,790 B1 * | 2/2004 | Ito .............................. 400/490 |
| 6,690,360 B1 * | 2/2004 | Johnston et al. ............ 345/168 |
| 6,717,083 B1 * | 4/2004 | Chen et al. ................. 200/310 |

* cited by examiner

Primary Examiner—Michael Friedhofer
Assistant Examiner—Lisa Klaus
(74) Attorney, Agent, or Firm—Schulte Roth & Zabel LLP; Joel E. Lutzker; Anna Vishev

(57) ABSTRACT

This keyboard spill-proofing mechanism reduces and prevents damage to the electronic circuitry in keyboard that would normally occur due to inadvertent spillages of liquids, such as water, coffee or soda, onto the keyboard. This keyboard spill-proofing mechanism features a membrane sheet positioned below the top case. The membrane sheet includes multiple layers that have electrical circuits. The electrical circuits detect the off/on state of the key caps when they are pressed. The keyboard design features a waterproof base sheet made of an adhesive material that is positioned between the top case and the membrane sheet. The waterproof base sheet is designed such that a plurality of rubber springs connected thereon transmit the off/on state of the key caps to the electrical circuits in the membrane sheet. The waterproof base sheet is also designed so that it has multiple blocking portions which project upward from the waterproof base sheet so as to prevent spilled liquid from flowing downward onto the membrane sheet thereby preventing or reducing possible damage to the electrical circuits in the membrane sheet of the keyboard.

13 Claims, 4 Drawing Sheets

KEYBOARD SPILL-PROOFING MECHANISM

CROSS-REFERENCE TO RELATED APPLICATIONS

This application claims priority from Japanese Application Serial No. 2002-076158, filed Mar. 19, 2002.

BACKGROUND OF THE INVENTION

1. Field of the Invention

The present invention relates to a keyboard for use in a word processor or computer, and relates in particular to a keyboard spill-proofing mechanism that prevents the inflow of water droplets, coffee or other liquids to a membrane sheet having an electrical circuit inside the keyboard.

2. Description of the Prior Art

A typical problem faced by keyboard users is that when a beverage such as coffee is spilled on a keyboard of a computer or word processor, the liquid reaches circuit boards with sensitive electronic components within the keyboard and results in short circuits or other electrical problems. In the past, sealing parts were positioned around circuit boards in the places where liquids could possibly enter the keyboard so that liquids would not reach the circuit boards or other sensitive components. In this keyboard design, the circuit boards were sealed by pressing and joining the sealing parts with a joining piece, etc. between the keyboard upper and lower covers, thus preventing the penetration of liquids to the circuit board.

As described above, placing the sealing parts around a circuit board and pressure joining the sealing parts to an upper cover and a lower cover may result in water tightness or spill proofing the circuit board. However, the sealing parts must be placed under a considerable amount of adhesion pressure in order to achieve the desired level of spill proofing. Accordingly, a disadvantage of this design is that to obtain rigidity sufficient to withstand the significant amount of the required adhesion pressure, the slab thickness of peripheral parts, etc. must be increased. An increased thickness of such parts results in a thicker keyboard. Another disadvantage of this design is that there is also a necessity to control accuracies in the assembly process in order attain the desired level of spill proofing obtained by adhesion pressure. Such increased production requirements result in a decline in work efficiency.

Another spill-proofing keyboard design is found in Laid Open Japanese Patent No. 2001-228950. This patent discloses a waterproof keyboard device equipped with a keyboard unit, an enclosure, and absorptive pieces. The enclosure is comprised of holders that hold the keyboard unit, and a housing that houses a printed circuit board. The absorptive pieces are placed around the holders to absorb liquids and to prevent spillage onto the circuit board. These absorptive pieces are comprised of a water-permeable surface sheet and a water-impermeable underside sheet. Additionally, an absorptive hydroscopic polymer is positioned between the surface and underside sheet of the absorptive pieces. A disadvantage of this design is that the structure of the absorptive pieces is complex and may result in increased production costs.

SUMMARY OF THE PRESENT INVENTION

Accordingly, the object of present invention is to eliminate some of the disadvantages found in the prior art and to provide a keyboard spill-proofing mechanism with a simple structure that prevents the inflow or spillage of liquids onto a circuit board, membrane sheet having an electrical circuit. Another object of the present invention is to design a simple structure for preventing keyboard damage caused by liquids so that the manufacturing costs of such a keyboard are minimized and work efficiency is improved.

In general the first aspect of the present invention features a keyboard spill-proofing mechanism that includes a top case, wherein that top case engages a plurality of key caps so that the key caps are allowed to slide freely. The keyboard also includes a membrane sheet position below the top case. The membrane sheet includes multiple layers that have electrical circuits. The electrical circuits detect the off/on state of the key caps when they are pressed. Moreover, the keyboard includes a back plate positioned below the membrane sheet. A waterproof base sheet is positioned between the top case and the membrane sheet. The waterproof base sheet includes a plurality of rubber springs connected thereon that transmit the off/on state of the key caps to the electrical circuits in the membrane sheet. The waterproof base sheet may also be designed to include multiple blocking portions that project upward from the waterproof base sheet so as to prevent spilled liquid from flowing onto the membrane sheet.

Embodiments of the present invention may further include one or more of the following features. Blocking portions that project upward from the waterproof base sheet may be formed around the outer perimeter of the waterproof base sheet. Moreover, blocking portions which project upward from the waterproof base sheet may also be formed around the outer perimeter of a plurality openings formed in the waterproof base sheet. The blocking portions that project upward from the waterproof base sheet are of a height that can prevent liquids from flowing onto the membrane sheet. The height of such blocking portions may be 0.2 mm.

The membrane sheet is multi-layered and may further include a spacer sheet that is disposed between the multiple sheet layers having electrical circuits. The waterproof base sheet may be made of an adhesive material, such as PET film or the like. Moreover, the waterproof base sheet may also include a plurality of rubber springs having a coned-shape connected to its surface. The multiple rubber springs may be connected to the waterproof base sheet with an adhesive material. The top case may further include connecting bosses that connect the top case to the back plate by allowing the connecting bosses to penetrate the plurality of openings in the waterproof base sheet.

The keyboard spill-proofing mechanism of the present invention features blocking portions that project upward from the perimeter of a waterproof base sheet and openings that substantially reduce the possibility that liquid spilled on such a keyboard will damage the electronic circuits therein. This blocking structure can be manufactured simply and inexpensively.

The above aspects, advantages and features are of representative embodiments only. It should be understood that they are not to be considered limitations on the invention as defined by the claims. Additional features and advantages of the invention will become apparent in the following description, from the drawings, and from the claims.

BRIEF DESCRIPTION OF THE DRAWINGS

The invention is illustrated by way of example and not limitation and the figures of the accompanying drawings in which like references denote like or corresponding parts, and in which.

DETAILED DESCRIPTION

Referring to FIGS. 1–7, we provide detail descriptions of various embodiments of the keyboard spill-proofing mechanism disclosed in the present invention.

Figure 1:
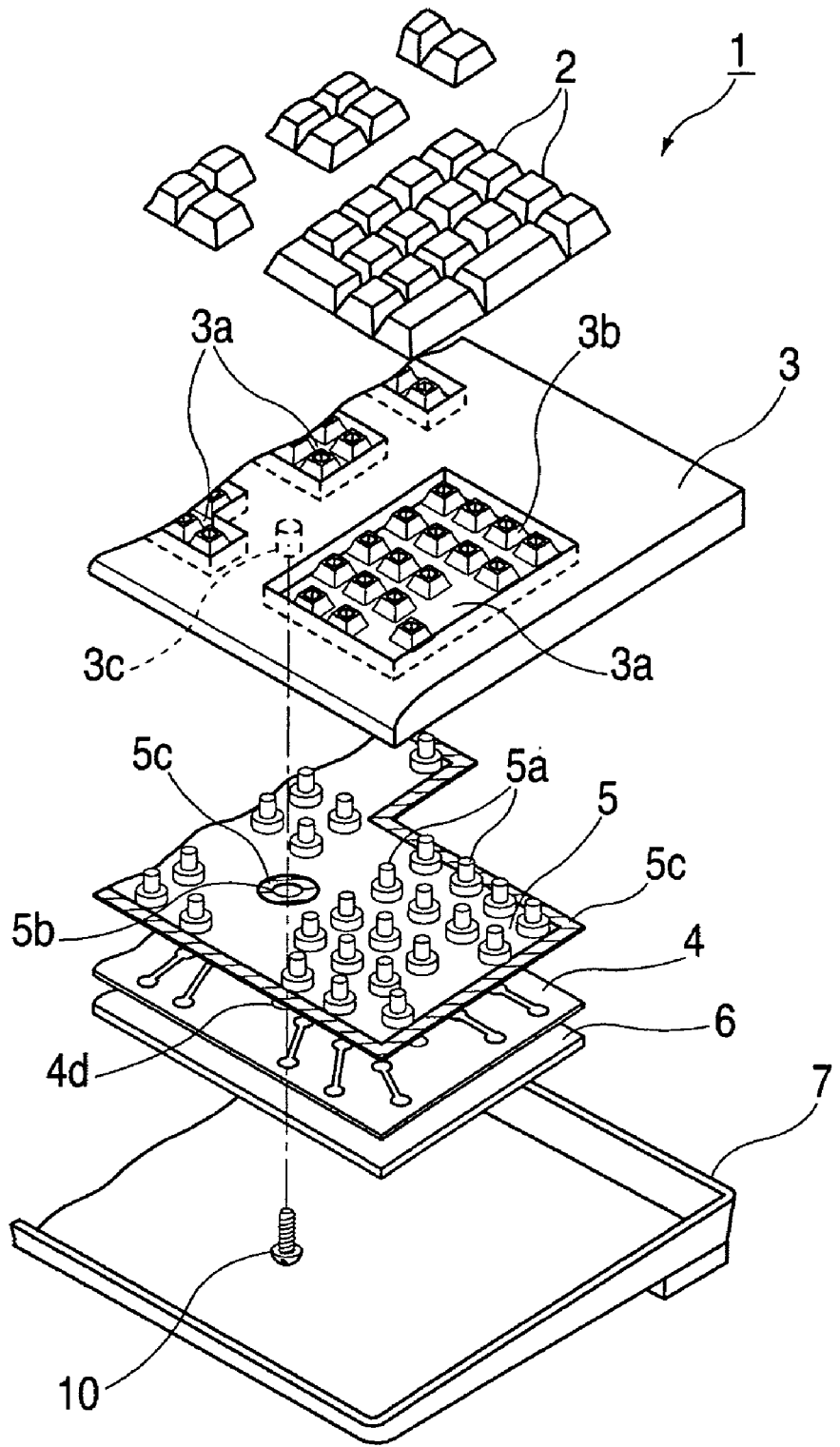
FIG. 1 shows an exploded view of a spill-proofing keyboard.

FIG. 1 shows an exploded view of a spill-proofing keyboard. As shown in FIG. 1, a keyboard 1 includes a plurality of key caps 2 and top case 3. Top case 3 fits together with key caps 2 so as to allow key caps 2 to slide freely. Top case 3 is substantially rectangularly shaped and made of synthetic resin. Moreover, top case 3 has concave areas 3a in which each key cap 2 is positioned. Top case 3 also has multiple hollow bosses 3b that are integrally formed inside concave areas 3a so as to provide a specified space or gap in the left-right and up-down directions. Key caps 2 fit into hollow bosses 3b so as to allow key caps 2 to move freely in the vertical direction. Multiple connecting bosses 3c are formed in top case 3 and project downward therefrom. Connection bosses 3c serve to connect top case 3 to back plate 6 by penetrating through waterproof base sheet 5 and membrane sheet 4. Connecting bosses 3c are formed to be approximately cylindrically or elliptically shaped. Waterproof base sheet 5 is positioned below top case 3. Waterproof base sheet 5 may be made from an adhesive material such as PET film or the like and is substantially rectangular in shape. Waterproof base sheet 5 also contains a plurality of rubber springs 5a that allow vertical movement of key caps 2 to be transmitted to membrane sheet 4.

Membrane sheet 4 contains through-holes 4d and is positioned below waterproof base sheet 5. Back plate 6 is positioned below membrane sheet 4. Back plate 6 may be made from a thin metal or the like and has a rectangular-shape similar to that of membrane sheet 4. Bottom case 7 is positioned below back plate 6. Attachment screws 10 are inserted through back plate 6, waterproof base sheet 5 and membrane sheet 4 and into connecting boss 3c of top case 3 so as to securely maintain the relative positions of back plate 6, membrane sheet 4 and waterproof base sheet 5 to top case 3.

Figure 2:
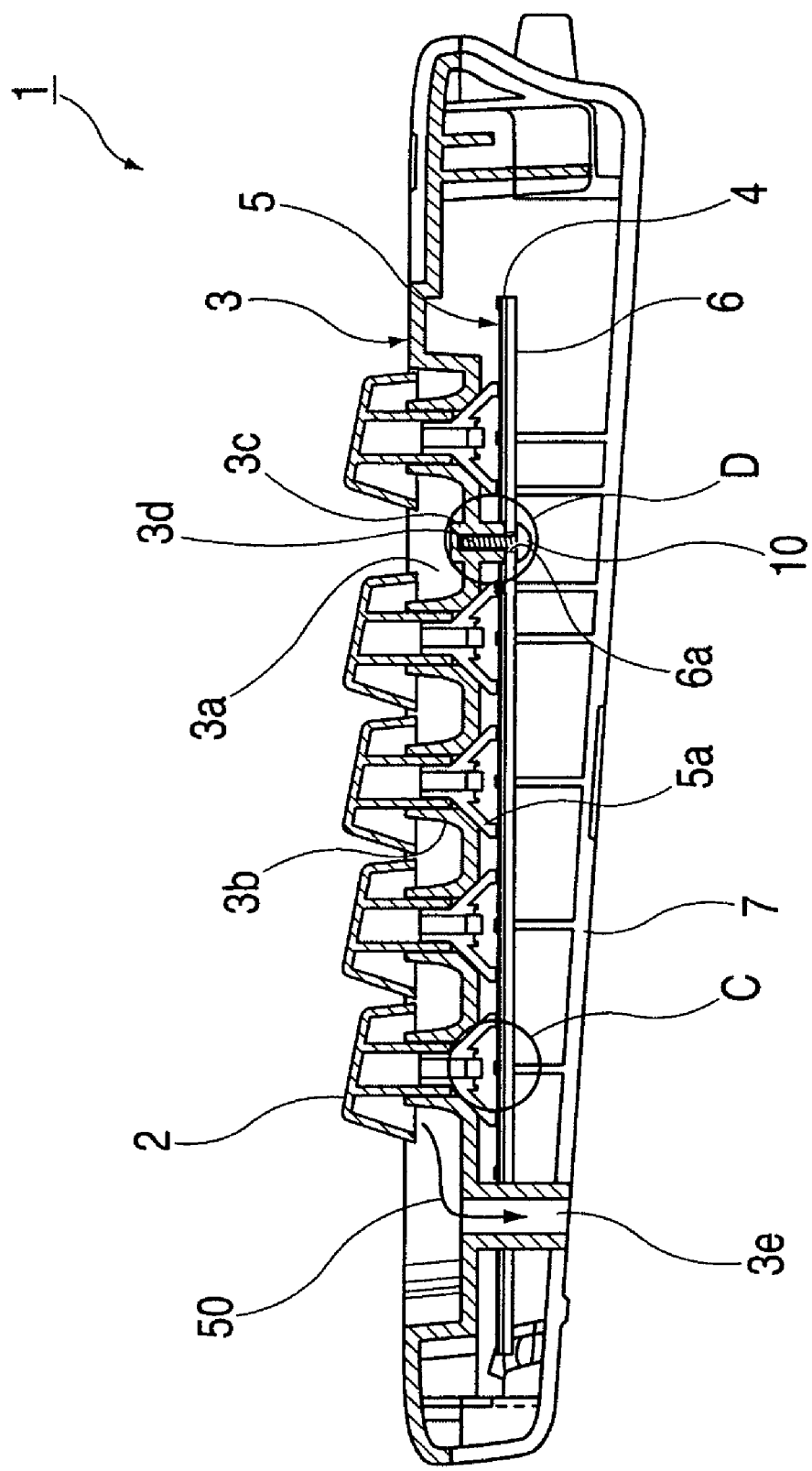
FIG. 2 shows a cross sectional view of a spill-proofing keyboard.

FIG. 2 shows a cross sectional view of a spill-proofing keyboard. As shown in FIG. 2, keyboard 1 further includes insertion holes 3d which are formed on the ends of connecting bosses 3c so that attachment screws 10 can be inserted therein. Keyboard 1 also has drain hole 3e formed in the lower part of top case 3. Drain hole 3e is designed so that the majority of any liquid spilled on keyboard 1 and which penetrates key caps 2 would flow through drain hole 3e and out through bottom case 7 of keyboard 1, as shown by arrow 50. Bottom case 7 may be made of a synthetic resin or the like and is formed to have a box shape or rectangular shape so as to provide a housing for waterproof base sheet 5, and membrane sheet 4. At specified positions bottom case 7 is attached to top case 3 by attachment screws (not shown). Multiple penetrating holes 6a are formed in back plate 6 that are penetrated by attachment screws 10 which screw into connecting bosses 3c in top case 3. Penetrating holes 6a are formed in positions that correspond to those of connecting bosses 3c in top case 3. Structures shown in FIG. 2 as C and D include top case 3, membrane sheet 4, base sheet 5, and back plate 6 will be described in further detail in FIG. 6.

Figure 3:
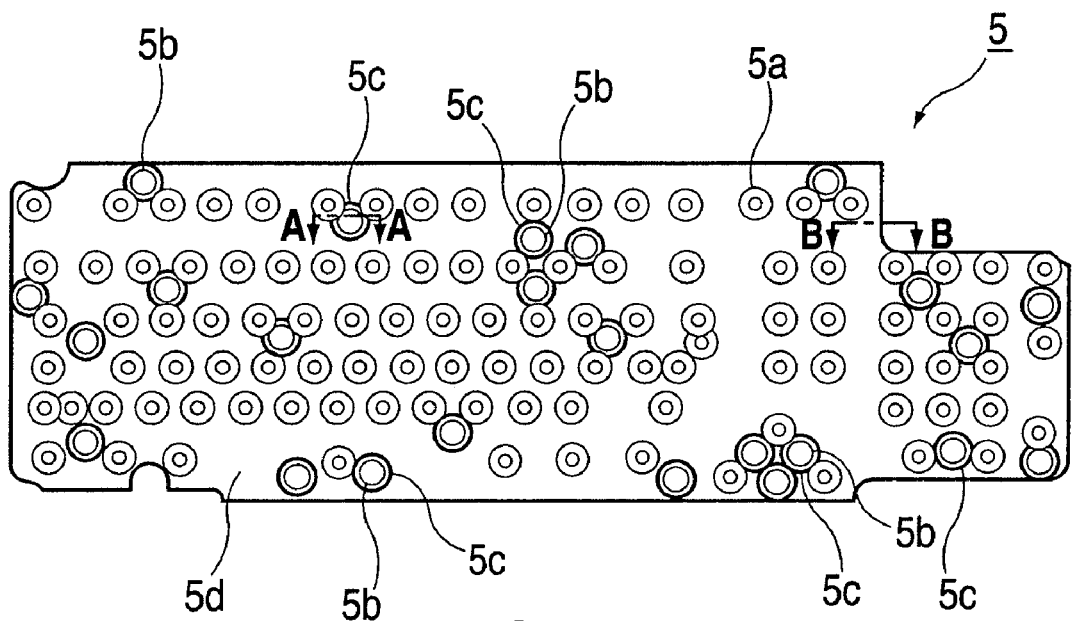
FIG. 3 shows the waterproof base sheet that is a constituent part of a spill-proofing keyboard.

FIG. 3 shows the waterproof base sheet that is a constituent part of the spill-proofing keyboard. As shown in FIG. 3, a plurality of cone-shaped rubber springs 5a are connected to waterproof base sheet 5 and project upwardly leaving a specified gap in the left-right and up-down directions. Rubber springs 5a may be connected with adhesive or the like to cause rubber springs to adhere to the surface of waterproof base sheet 5. In addition, a plurality of circular or elliptical openings 5b are formed at specified positions in waterproof base sheet 5. Connecting bosses 3c that are formed in top case 3 penetrates openings 5b. Blocking portions 5c, which are shown as heavy or bold black lines, are of specified width and formed in the silicon-based adhesive layer. Block portions are formed around the entire perimeter of openings 5b. Main plane 5d is the main portion of waterproof base sheet 5. As shown in FIG. 3, blocking portions 5c are also formed around the entire outer perimeter of waterproof base sheet 5.

Figure 4:
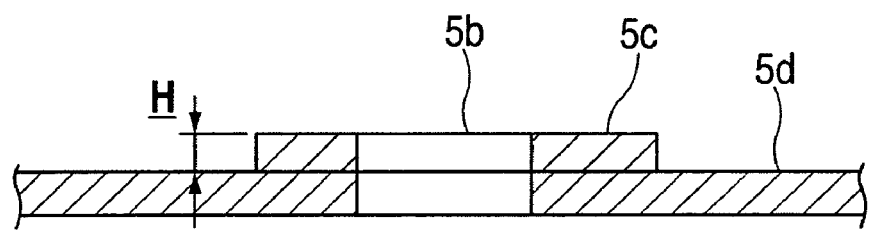
FIG. 4 is a cross sectional view along the line A—A in FIG. 3.

FIG. 4 is a cross sectional view along the line A—A in FIG. 3. As shown in FIG. 4, block portions 5c surround the entire perimeter of openings 5b. Blocking portions 5c project upwardly at a fixed height H from waterproof base sheet 5 main plane 5d. The fixed height H may be approximately 0.2 mm.

Figure 5:
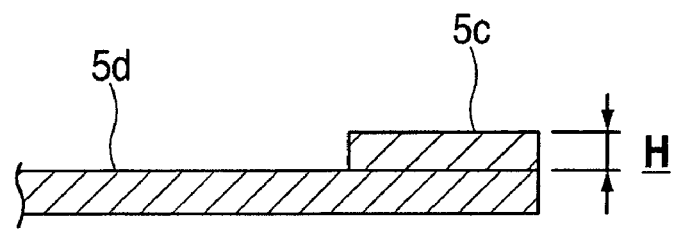
FIG. 5 is a cross sectional view along the line B—B in FIG. 3.

FIG. 5 is a cross sectional view along the line B—B in FIG. 3. As shown in FIG. 5, blocking portions 5c are also formed around the entire outer perimeter of waterproof base sheet 5 and are positioned on top of main plane 5d. Block portions 5c project upwardly at a fixed height H from waterproof base sheet 5 main plane 5d. The fixed height H may be approximately 0.2 mm.

Figure 6:
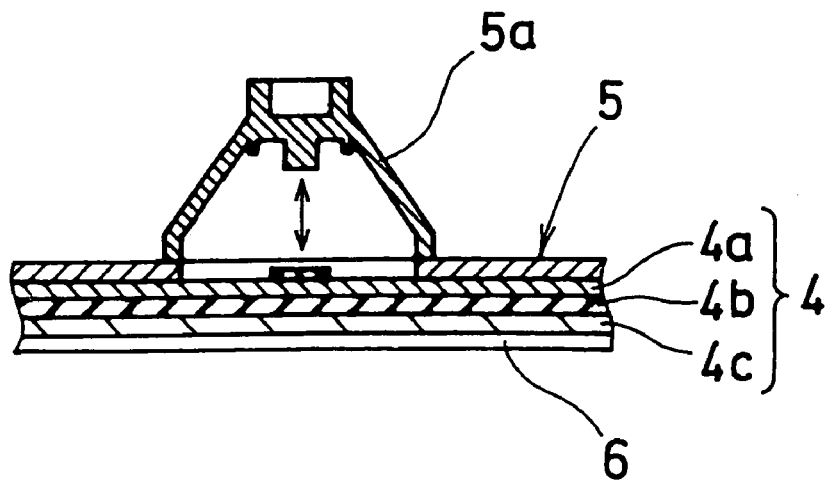
FIG. 6 is an expanded cross sectional view of the C portion of FIG. 2.

FIG. 6 is an expanded cross sectional view of the C portion of FIG. 2. As shown in FIG. 6, membrane sheet 4 includes several layers each made of a laminated material or the like. The embodiment of the present invention depicted in FIG. 6 includes upper membrane sheet 4a, spacer sheet 4b and lower membrane sheet 4c. Upper membrane sheet 4a and lower membrane sheet 4c each contain an electrical circuit. Spacer sheet 4b is positioned between upper membrane sheet 4a and lower membrane sheet 4c.

Figure 7:
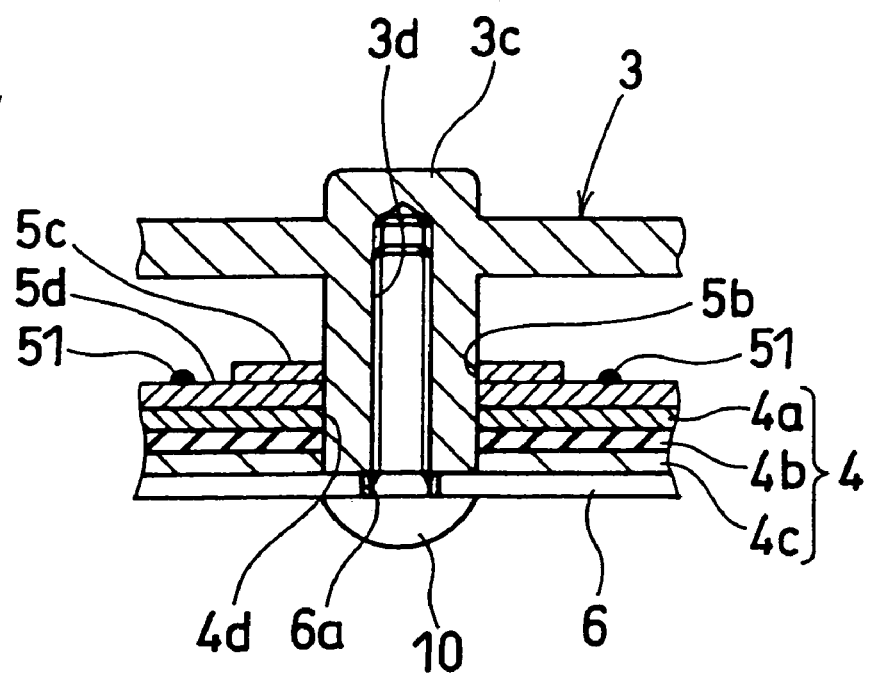
FIG. 7 is an expanded cross sectional view of the D portion of FIG. 2.

FIG. 7 is an expanded cross sectional view of the D portion of FIG. 2. As shown is FIG. 7, through-holes 4d are formed in each laminated layer of membrane sheet 4. Through-holes 4d of membrane sheet 4 and openings 5b of waterproof base sheet are penetrated by top case 3 connecting bosses 3c. Also shown in FIG. 6 are penetrating holes 6a that are formed in back plate 6 which allow attachment screws 10 to penetrate back plate 6 and, through corresponding openings 5b of waterproof base sheet 5 and through-holes 4d of membrane sheet 4, to engage connecting bosses 3c. The columnar portions of key caps 2 are engaged with top case 3 hollow bosses 3b so as to slide freely and to contact the upper surface of rubber springs 5a that is adhered to waterproof base sheet 5. Waterproof base sheet 5 and membrane sheet 4 are mounted over back plate 6. Liquid droplet 51 is shown on main plane 5*d*.

FIGS. 2 and 6 also show that key caps 2 move in the vertical direction and engage top case 3 connecting bosses 3*c* so as to slide freely. The vertical movement of key caps 2 causes rubber spring 5*a* of waterproof base sheet 5 to also move vertically or in the up and down direction as shown by the arrows in FIG. 6. The movement of key caps 2 causes the on/off state of key caps 2 to be transmitted to the electrical circuit in upper membrane sheet 4*a*.

The keyboard waterproof mechanism of the present invention can therefore significantly reduce or eliminate any damage that may result from the accidental spilling of liquids onto the keyboard. Accordingly, when a liquid is spilled on the keyboard of the present invention, the majority of the liquid that leaks between key caps 2 will flow into drain holes 3*e* and drain out from the keyboard, as shown by arrows 50 in FIG. 2. As shown in FIG. 7, to avoid causing irreparable damage to the electronic circuits and components housed therein, blocking portion 5*c* of waterproof base sheet 5, which is positioned below top case 3, is designed so that small quantities of excess liquid 51 that are not drained of into drain holes 3*e* do not further penetrate downward into the keyboard. Blocking portion 5*c* are formed around the edge of openings 5*b* in waterproof base sheet 5 and project upward from main plane 5*d*. The upward projection of blocking portion 5*c* prevents any liquid on the surface of main plane 5*d* from entering or flowing into openings 5*b* and onto membrane sheet 4 positioned below waterproof base sheet 5.

In accordance with one embodiment of the present invention any small quantity of excess liquid that is spilled onto top case 3 and flows onto waterproof base sheet 5 will be prevented from flowing onto and damaging membrane sheet 4 by causing electrical short or other electrical problems. More specifically, waterproof base sheet 5 is designed such that upward projects are formed in waterproof base sheet 5 around openings 5*b* that ensure that the flow of liquid is prevented from entering such openings and flowing onto membrane sheet 4 below.

Further, in accordance with one embodiment of the present invention top case 3 and back plate 6 are connected by connecting bosses 3*c* which are disposed in top case 3 and penetrate openings in waterproof base sheet 5, and membrane sheet 4.

Further, in accordance with at least one embodiment of the present invention blocking portions 5*c* are formed in waterproof base sheet 5 and are of a specified height.

The block portions described above can be easily designed with simple structures so as to reduce manufacturing costs.

In the foregoing description, the apparatus of the present invention have been described with reference to specific examples. It is to be understood and expected that variations in the principles of the apparatus herein disclosed may be made by one skilled in the art and it is intended that such modifications, changes, and substitutions are to be included within the scope of the present invention as set forth in the appended claims. The specification and drawings are accordingly to be regarded in an illustrative rather than restrictive sense.

What is claimed is:

1. A keyboard spill-proofing mechanism comprising:
   a top case engaging a plurality of key caps and allowing them to slide freely;
   a membrane sheet positioned below said top case, said membrane sheet including a plurality of layers having electrical circuits, which detect the off/on state of said key caps;
   a back plate positioned below said membrane sheet;
   a waterproof base sheet positioned between said top case and said membrane sheet, wherein said waterproof base sheet includes a plurality of rubber springs positioned thereon which transmit the off/on state of said key caps to said electrical circuits in said membrane sheet and multiple blocking portions which project upward from said waterproof base sheet so as to prevent spilled liquid from flowing onto said membrane sheet; and
   a plurality of drain holes opening in the top case and draining through a tube, wherein said tube drains through said waterproof base sheet, membrane sheet, and back plate.

2. The keyboard spill-proofing mechanism of claim 1, wherein said blocking portions which project upward from said waterproof base sheet are formed around an outer perimeter of said waterproof base sheet.

3. The keyboard spill-proofing mechanism of claim 1, wherein a plurality of openings is formed in said waterproof base sheet and wherein said blocking portions which project upward from said waterproof base sheet are formed around an outer perimeter of at least one of said plurality of openings.

4. The keyboard spill-proofing mechanism of claim 3, wherein said top case further comprises connecting bosses that connect said top case to said back plate by allowing said connecting bosses to penetrate said plurality of openings in said waterproof base sheet.

5. The keyboard spill-proofing mechanism of claim 4, wherein said plurality of openings are elliptically shaped.

6. The keyboard spill-proofing mechanism of claim 4, wherein said plurality of openings are circularly shaped.

7. The keyboard spill-proofing mechanism of claim 1, wherein said blocking portions which project upward from said waterproof base sheet are of a height which prevent liquids from flowing onto said membrane sheet.

8. The keyboard spill-proofing mechanism of claim 7, wherein said height is 0.2 mm.

9. The keyboard spill-proofing mechanism of claim 1, wherein said membrane sheet further comprises a spacer sheet disposed between said plurality of layers having electrical circuits.

10. The keyboard spill-proofing mechanism of claim 1, wherein said waterproof base sheet is made of an adhesive material.

11. The keyboard spill-proofing mechanism of claim 1, wherein said waterproof base sheet is made of PET film.

12. The keyboard spill-proofing mechanism of claim 1, wherein said plurality of rubber springs are coned-shaped.

13. The keyboard spill-proofing mechanism of claim 1, wherein said plurality of rubber springs is connected to said waterproof base sheet with an adhesive material.

* * * * *